Patented Apr. 29, 1924.

1,492,165

UNITED STATES PATENT OFFICE.

ERNEST FOSTER, OF NORTH BRUNSWICK, VICTORIA, AUSTRALIA, ASSIGNOR TO VERMONT CASEIN PTY. LTD., OF MELBOURNE, VICTORIA, AUSTRALIA, A BRITISH COMPANY.

PROCESS FOR DRYING CASEIN CURD.

No Drawing. Application filed December 12, 1922. Serial No. 606,528.

*To all whom it may concern:*

Be it known that I, ERNEST FOSTER, a subject of the King of Great Britain, residing at 88 Cassells Road, North Brunswick, in the State of Victoria, Commonwealth of Australia, engineer, have invented a certain new and Improved Process for Drying Casein Curd, of which the following is a specification.

This invention has for its object the extraction of moisture from casein to render it fit to be used in manufactures.

At present the wet or raw curd is taken in bulk and passed through a chopping machine and then spread upon canvas trays and heated. Such a process is objectionable in that the heat is not applied evenly and thoroughly to the surfaces of the material, which is liable to set up fermentation on that part in contact with the canvas. The ferment produces discoloration in the casein which affects its appearance, an important consideration where clarity in the product is desired.

It is to avoid such happening and to extract evaporable fluid such as water from the wet or raw curd that this invention has been devised, according to which the curd is first broken into lumps of about half a pound weight and impelled in the presence of a maintained blast of heated air along a vertically disposed conduit towards an obstructing plate. Impact upon the plate breaks it up but not finely, owing to the retained moisture, and in order to further disintegrate the material in complete contact with the hot air, the curd, after being impelled for the first time against the plate, is returned to the starting point by gravitation and again driven with the hot blast against the plate. This is repeated several times. The plate is within a lantern or container having gratings or screens in the sides, of a mesh according to the size required. When the material has been sufficiently reduced in size and dried it will pass through the screens and gravitate to graders prior to being bagged.

As the curd dries, a certain quantity of fine dust is produced. This material in suspension is carried away from a chamber surrounding the container through an exhaust pipe in which a silk bag or other suitable device, that filters the air as it escapes and retains the fine particles.

The result is a well dried and clean casein product, evenly graded, that can then be treated by ordinary and well-known processes of manufacture with satisfactory results.

Having now described my invention what I claim as new and desire to secure by Letters Patent is:—

The method of drying casein consisting in breaking raw curd into lumps, impelling the lumps upwardly, in the presence of a maintained blast of heated air against an obstruction, to partially dry and further break the same, permitting the broken particles to drop by gravity, and repeatedly reimpelling the particles in the presence of the blast of drying heated air against said obstruction until such particles are dry, and screening the same.

In witness whereof I affix my signature.

ERNEST FOSTER.